United States Patent [19]

Pleasance

[11] 4,168,474
[45] Sep. 18, 1979

[54] GENERATION OF 14 μM AND 16 μM LASER RADIATION FROM A $CO_2$ GAS LASER

[75] Inventor: Lyn D. Pleasance, Pittsburgh, Pa.

[73] Assignee: Westinghouse Electric Corp., Pittsburgh, Pa.

[21] Appl. No.: 719,202

[22] Filed: Aug. 30, 1976

[51] Int. Cl.² .......................................... H01S 3/097
[52] U.S. Cl. .............................................. 331/94.5 G
[58] Field of Search ................. 331/94.5 G, 94.5 P; 330/4.3 (U.S. only)

[56]  References Cited

U.S. PATENT DOCUMENTS

| | | | |
|---|---|---|---|
| 3,713,030 | 1/1973 | Kantrowitz et al. | 331/94.5 P |
| 3,946,332 | 3/1976 | Samis | 331/94.5 G |
| 4,028,635 | 6/1977 | Brunet | 331/94.5 G |
| 4,053,851 | 11/1977 | Krupke | 331/94.5 G |
| 4,053,852 | 11/1977 | Krupke | 331/94.5 G |

OTHER PUBLICATIONS

Osgood, Jr., R. M., *Applied Physics Letters*, vol. 28, No. 6, Mar. 15, 1976, pp. 342–345.

*Primary Examiner*—William L. Sikes
*Assistant Examiner*—Marcus S. Rasco
*Attorney, Agent, or Firm*—M. P. Lynch

[57] ABSTRACT

Described herein is a technique for generating 16 μm laser radiation from a $CO_2$ molecular gas laser system by use of the $02^00$–$01^10$ vibrational transition of $CO_2$. The technique employs a system for pumping the $CO_2$ molecules from the ground state to the $00^01$ vibrational energy level such that a population inversion is created between the $00^01$ and $02^00$ energy levels, and transferring the population of $CO_2$ molecules from the $00^01$ level to the $02^00$ vibrational energy levels by stimulated emission in a time less than the collisional deactivation time of the $CO_2$ molecule in the $02^00$ level. This transfer creates a population inversion between the $02^00$ and the $01^10$ vibrational energy levels of the $CO_2$ molecule which results in 16 μm laser radiation. A similar technique for generating 14 μm laser radiation from a $CO_2$ molecular gas system is achieved by use of the $10^00$–$01^10$ vibrational transition.

13 Claims, 8 Drawing Figures

POPULATING THE $00^01$ VIBRATIONAL ENERGY LEVEL WITH EXCITED $CO_2$ MOLECULES TO ACHIEVE A POPULATION INVERSION BETWEEN THE $00^01$ AND THE $10^00$ VIBRATIONAL ENERGY LEVELS OF THE $CO_2$ MOLECULE.

↓

TRANSFERRING EXCITED $CO_2$ MOLECULES FROM THE $00^01$ VIBRATIONAL ENERGY LEVEL TO THE $10^00$ VIBRATIONAL ENERGY LEVEL IN A TIME LESS THAN THE COLLISIONAL DEACTIVATION TIME OF THE $CO_2$ MOLECULE IN THE $10^00$ VIBRATIONAL ENERGY LEVEL TO ACHIEVE A POPULATION INVERSION BETWEEN THE $10^00$ VIBRATIONAL ENERGY LEVEL AND THE $01^10$ VIBRATIONAL ENERGY LEVEL OF THE $CO_2$ MOLECULE.

↓

EXTRACTING THE ENERGY IN THE POPULATION INVERSION IN THE FORM OF 14 μm LASER EMISSION.

FIG. 2A

GENERATION OF 14 μM AND 16 μM LASER RADIATION FROM A CO₂ GAS LASER

BACKGROUND OF THE INVENTION

1. Field of the Invention

The invention relates to the generation of infrared laser radiation from a molecular gas, in particular from transitions between the $02^00$ level and the $01^10$ level, as well as transitions between the $10^00$ and $01^10$ vibrational levels of the $CO_2$ molecule.

2. Description of the Prior Art

Since their discovery, lasers have been used increasingly for commercial application. High efficiency, high power output, and simplicity of operation are desirable system characteristics for such lasers. Recently, attention has been focused upon the potential use of lasers for separation of isotopes, particularly isotopes of uranium. An important quality of the laser for achieving isotope separation is the spectral coincidence of the laser emission with an absorption line of a single isotope. A strong absorption band of uranium hexafluoride ($UF_6$) is centered at a wavelength of approximately 16 micrometers (μm). Lasers of adequate quality are not presently available at this wavelength for uranium isotope separation or, in general, at any wavelength between 12 μm and 20 μm for other applications.

Previous work with $CO_2$ lasers on transitions which produce wavelengths of approximately 9.4 μm and 10.6 μm has been extensive. However, despite a decade of active research which focused on these laser transitions, the possibility of using stimulated emission at these wavelengths to excite 14 μm or 16 μm laser emission from transitions to the $01^10$ vibrational level was not suggested.

Infrared laser radiation at wavelengths near 14 μm and 16 μm has been obtained previously from a $CO_2$ gas. Approaches for generating such laser radiation have been directed to the vibrational levels of the $CO_2$ molecules at energies above that of the $00^01$ level. Laser emission from transition to vibrational levels at lower energies, specifically to the $01^10$ level, has not been considered feasible for several reasons. It was generally thought that the collisional lifetimes of these lower energy vibrational levels of the $CO_2$ molecules were short compared to the time required to achieve a population inversion between the desired lasing levels. However, recent evidence suggests that the lifetimes of these levels are long enough to support a population inversion. Furthermore, conventional means for selectively pumping the desired levels were ineffective since such means typically populated the $01^10$ level, the lower level of the lasing transitions. This problem is circumvented by exciting the laser transitions using transfer by stimulated emission from a level which can be selectively pumped. Adding to the complexity of the problem is the proximity of the $01^10$ level to the ground state. At room temperature, this level exhibits a relatively high thermal population. This increases the threshold conditions for achieving successful laser operation. The thermal population of the $01^10$ level can be reduced by cooling the gas mixture.

A technique for generating 16 μm laser radiation is discussed by R. M. Osgood, Jr., "Optionally Pumped 16 μm $CO_2$ Laser", Appl. Phys. Lett. 28, 342, 1976.

SUMMARY OF THE INVENTION

The object of the present invention is to generate laser radiation at approximately 14 micrometer (μm) and 16 micrometer (μm) from a gas laser system operating on transitions to the $01^10$ vibrational level of the $CO_2$ molecule.

In accordance with the present invention, method and apparatus for generation of 14 μm laser radiation is disclosed to satisfy the following conditions:

1. Exciting the $00^01$ vibrational level of the $CO_2$ molecule such that a population inversion is created between rotational states of the $00^01$ and rotational states of $10^00$ vibrational levels,
2. Transferring the population from the $00^01$ vibrational energy level of the $CO_2$ molecule to the $10^00$ vibrational energy level of the $CO_2$ molecule by stimulated emission on transitions between said rotational states of the $00^01$ and $10^00$ vibrational levels such that a population inversion is created between rotational states of the $10^00$ vibrational energy level and rotational states of the $01^10$ vibrational level,
3. Extracting the laser radiation of approximately 14 μm from the laser cavity.

In accordance with the present invention, method and apparatus for generating 16 μm laser radiation is disclosed to satisfy the following conditions:

1. Exciting the $00^01$ vibrational energy level of the $CO_2$ molecule such that a population inversion is created between rotational states of the $00^01$ and rotational states of the $02^00$ vibrational levels,
2. Transferring the population from the $00^01$ vibrational energy level of the $CO_2$ molecule to the $02^00$ vibrational energy level of the $CO_2$ molecule by stimulated emission on transitions between said rotational states of the $00^01$ and $02^00$ vibrational levels such that a population inversion is created between the rotational states of the $02^00$ level and the rotational states of the $01^10$ levels,
3. Extracting the laser radiation of approximately 16 μm from the laser cavity.

BRIEF DESCRIPTION OF THE DRAWINGS

FIGS. 2A and 2B summarize the process steps for generating 14 μm and 16 μm laser radiation respectively;

DESCRIPTION OF THE PREFERRED EMBODIMENT

Figure 1:
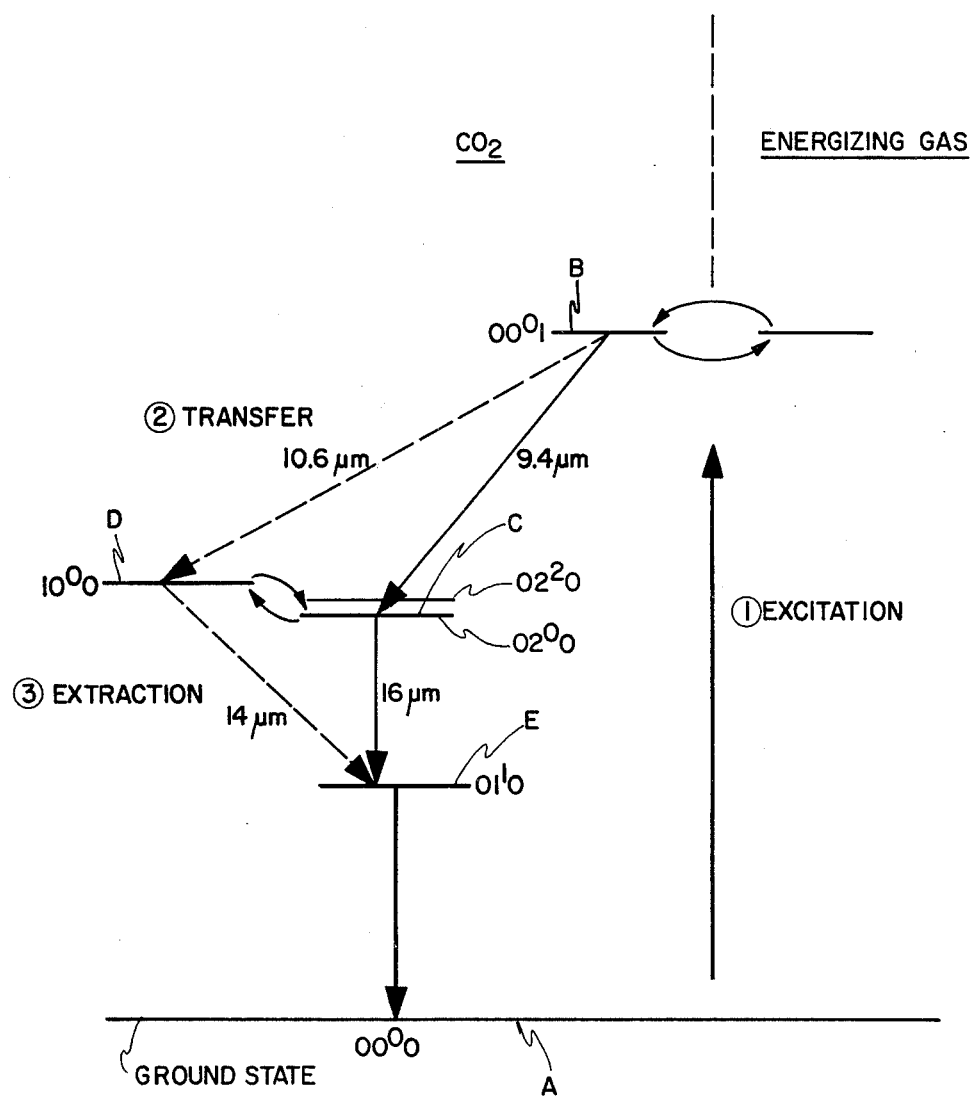
FIG. 1 illustrates the energy level of the energizing gas and the vibrational energy levels of the $CO_2$ molecule used for generating 14 μm and 16 μm laser radiation.

The operation of a $CO_2$ laser in accordance with the teachings of this invention is illustrated in the laser energy scheme of FIG. 1.

The first step of the process is to excite $CO_2$ gas or a gas mixture containing $CO_2$ from its ground state A to the first laser level B corresponding to the $00^01$ vibrational level of $CO_2$. This excitation may be accomplished by any one of several techniques, including direct optical or electrical pumping of the $00^01$ level, or by collisional transfer to the $00^01$ level from an excited level of a gas constituent which is populated by optical or electrical pumping. Such a gas constituent suitable for excitation by collisional transfer will be subsequently referred to as an energizing gas. The energizing gas used will depend on the particular excitation technique. However, in any case, an effective energizing gas is one which has an energy level in near resonance with the $00^01$ vibrational level of the $CO_2$ molecule, which has a large cross section for collisional transfer to the $00^01$ level and which has a larger excitation cross section than that of the $CO_2$ molecule at the $00^01$ level. The strong coupling of the energy levels by collisions is indicated by the curved arrows in FIG. 1.

The second critical step in the generation of 16 $\mu$m laser radiation consists of rapidly transferring the population from the $CO_2$ ($00^01$) laser level B to the $CO_2$ ($02^00$) laser level C. Such transfer is preferably achieved in a time less than the collisional deactivation time of the laser level C, and can best be achieved by application of appropriate laser radiation of sufficient intensity to saturate the transition between the $CO_2$ ($00^01$) laser level B and the $CO_2$ ($02^00$) laser level C. The wavelength of the applied laser radiation corresponds to transitions between rotational states of the $00^01$ and rotational states of the $02^00$ vibrational levels of the $CO_2$ molecule at wavelengths of approximately 9.4 $\mu$m.

In generating 14 $\mu$m laser radiation, the population is transferred from the $CO_2$ ($00^01$) laser level B to the $CO_2$ ($10^00$) laser level D by application of laser radiation of wavelengths corresponding to transitions between rotational states of the $00^01$ level and rotational states of the $10^00$ vibrational level of the $CO_2$ molecule. Such wavelengths are approximately 10.6 $\mu$m. The magnitude of the population transferred in step 2 must be sufficient to produce a population inversion between states in the $CO_2$ ($02^00$) laser level B and states in the $CO_2$ ($01^10$) laser level E.

The third step of the laser process, extraction of the energy of the population inversion in the form of 16 $\mu$m laser radiation, is accomplished by stimulated emission between the $CO_2$ ($02^00$) laser level C and the $CO_2$ ($01^10$) laser level E. For 14 $\mu$m radiation, the stimulated emission occurs between $CO_2$ laser level D and $CO_2$ laser level E. Stimulated emission may be induced by a build-up of flux in an optical cavity in an oscillator configuration or by the application of flux from an external source in an amplifier configuration. Similarly, if the steps defined above were followed for generating 14 $\mu$m laser radiation, laser radiation at wavelengths corresponding to transitions between the $10^00$ and $01^10$ vibrational levels of the $CO_2$ molecule would be available for extraction from the laser cavity.

The final step illustrated in FIG. 1 consists of the relaxation of $CO_2$ molecules from the $CO_2$ ($01^10$) laser level E to the ground laser level state A to complete the cycle.

The description of the laser process outlined above describes several conditions required for successful laser action. These conditions require further discussion on the magnitudes and characteristic times involved. To aid in the discussion, consider the following simple model for the laser process. Let $n_1$ be the population in single rotational state of the $CO_2$ ($00^01$) vibrational level B, $n_2$ be the population of a single rotational state of the $CO_2$ ($02^00$) vibrational level C connected to $n_1$ by an allowed photon transition, and $n_3$ be the population of a single rotational state of the $CO_2$ ($01^10$) vibrational level E connected to $n_2$ by an allowed photon transition. Let the superscript $i$ refer to conditions after the excitation step has been completed but before the transfer step has been initiated. Ignoring the small effect of rotational degeneracies, the condition for an inversion between level B and level C is:

$$n_1^i > n_2^i \tag{1}$$

In practice, it is desirable that this condition be satisfied such that:

$$n_1^i >> n_2^i \tag{2}$$

In the transfer step, the application of a photon flux at the wavelength of the photon transition between levels B and C will cause a fraction of the population $n_1^i$ to be transferred to $n_2^f$ where superscript $f$ refers to the population after the transfer step but before the extraction step. For isolated states, the population will be:

$$n_1^f = n_2^f = (n_1^i + n_2^i)/2 \tag{3}$$

under saturated conditions. Sufficient photon flux must be applied to achieve this condition. The condition for a population inversion on the 16 $\mu$m transitions is:

$$n^f > (n_3^f/2) \tag{4}$$

where the factor of 2 reflects the vibrational degeneracy of the $CO_2$ ($01^10$) level E. Since the transfer step does not affect the population in the $01^10$ level, $n_3^f = n_3^i$ and equations (3) and (4) can be combined to give the threshold condition:

$$n_1^i > n_3^i - n_2^i \tag{5}$$

for 16 $\mu$m laser emission in terms of populations generated during the excitation pulse. In practice this condition should be strongly satisfied, i.e.,:

$$n_1^i > n_3^i - n_2^i \tag{6}$$

Equation (6) illustrates a general requirement of the laser excitation process that the $CO_2$ ($00^01$) level be strongly excited while maintaining the population in the $CO_2$ ($01^10$) level at lowest possible values. The lowest possible values of $n_3^i$ and $n_2^i$ are achieved if they are unaffected by the excitation process. In this case, their values are determined by the kinetic temperature of the gas prior to the excitation pulse.

In practice, the rotational and vibrational states are not isolated but rather are coupled by collisional processes. The effects of those processes are defined by various characteristic times which determine the time sequence and duration of each step of the laser process.

These characteristic times, in general, vary inversely with the density of the various components of the gas mixture and may be modified by the addition of components to the gas mixture to achieve a net desired result.

The excitation step should take place in a time commensurate with or shorter than the collisional deactivation time of the $00^01$ level. If an energizing gas is used, the effective collisional deactivation time is determined by the deactivation of the coupled system. Sufficient time should be allowed for the energizing gas to transfer energy to the $CO_2$ molecule at the $00^01$ energy level before initiating the transfer step. If the excitation process is not particularly selective, the population in the $01^10$ level may be substantially above the value determined by the gas kinetic temperature. It is desirable to wait a period of time before application of the transfer pulse so as to allow the population of the $01^10$ level to relax towards the thermal value. A gas constituent may be added to enhance this relaxation process. Such a gas component will be referred to as the "relaxing" gas. The energy dissipated in the relaxation process will be distributed among the various degrees of freedom in the components of the gas mixture and will result in a rise in the kinetic temperature of the gas. A component of the gas mixture whose primary function is to minimize this gas temperature rise will be referred to as a "buffer" gas.

In the transfer step, there are three processes whose characteristic times are of major importance; they are (1.) the time for equilibrization amoung the rotational states of each vibrational level, (2.) the time for redistribution of energy among other states of similar energy, and (3.) the time for collisional deactivation of the $CO_2$ ($02^00$) level C. At the end of the excitation step, the population in the $CO_2$ ($00^01$) level B is distributed among the various rotational states of that level. These rotational states are strongly coupled by collisions with the gas constituents. Transfer of the population of a single rotational level could be accomplished if sufficient photon flux were applied in a time shorter than the time for rotational redistribution. Operation under such conditions would be inefficient since only a small fraction of the energy in the $CO_2$ ($00^01$) level A would be utilized. A more efficient mode of operation is to transfer the population over a time longer than the rotational redistribution time. In this case, a large fraction of the population of the $CO_2$ ($00^01$) level B can be transferred. This transfer can be accomplished by application of a photon flux on a single laser transition or by application simultaneously on several transitions.

After or during the transfer process, the energy deposited in the $CO_2$ ($02^00$) level will be redistributed among the rotational states of the $CO_2$ ($02^00$) level B in a time characteristic of rotational equilibrization. In similar or slightly longer times, the population in the $CO_2$ ($02^00$) level will be redistributed by collisions among other vibrational states of $CO_2$ having similar energies. In particular, the states designated $CO_2$ ($02^00$) and $CO_2$ ($10^00$) are, in fact, mixed states split by a Fermi resonance. These two states are strongly coupled by collisions as indicated by the arrows connecting these two states in FIG. 1. In addition, population could also be redistributed to other states such as the $CO_2$ ($02^20$) level shown in FIG. 1. If the transfer step takes place over sufficient time to allow this intra-vibrational redistribution, the population distribution just prior to the extraction step will be independent of whether the transfer step took place through transitions from level B to level C or from level B to level D and a population inversion will be created simultaneously on the 14 $\mu$m and 16 $\mu$m transitions.

For efficient operation the transfer time should be less than the collisional deactivation time of the $CO_2$ ($02^00$) level B.

In the extraction step, laser inversion utilizing a single rotational transition could be obtained in a time short compared to the rotational redistribution time of the $CO_2$ ($02^00$) level B and $CO_2$ ($01^10$) level E. This would be inefficient since only a fraction of the available energy would be used. Operation in an amplifier configuration would be necessary to achieve such short extraction times. Extraction over a time period longer than the rotational redistribution time will utilize most of the available energy even if the extraction is through a single emission line. If extraction takes place after intra-vibrational redistribution has been established, simultaneous extraction on 14 $\mu$m and 16 $\mu$m transitions should be possible. In this case, the population distribution will favor the 16 $\mu$m transition. For efficient operation the extraction time should be shorter than the collisional deactivation time of the $CO_2$ ($02^00$) level C.

The configuration of the optical cavity will be determined by the time allowed for extraction. Under all conditions an amplifier configuration can be used for extraction. In this case, the sources used for the transfer and extraction are external to the active medium. If the build-up time of the 16 $\mu$m cavity flux is short compared to the collisional deactivation time, an oscillator configuration for the 16 $\mu$m cavity can be used. In the case of an oscillator configuration using an external transfer source, it is necessary to insure that self-oscillation does not occur on the transitions used for the transfer step. Self-oscillation on the transfer transitions can be used to affect the transfer step if a Q-switched cavity is used. A weak external source applied to the cavity may improve the operation of such a Q-switch self-transfer system.

The components of the gas mixture are determined by the conditions outlined above. A general gas mixture would consist of $CO_2$, an energizing gas, a relaxing gas and a buffer gas. One particular gas may serve several functions. The utility of gas for a specific function is determined by its differential effect on other processes, and in certain proportions two gases may be antagonistic. The particular gases used and their proportions will also be determined by the characteristics of the excitation process.

The discussion above applies in a similar manner to excitation of 14 $\mu$m laser emission using levels B, D and E of FIG. 1.

The energy level notations of FIG. 1 correspond to generally accepted notations such as those recited in the above-referenced article of Osgood.

Figure 2B:
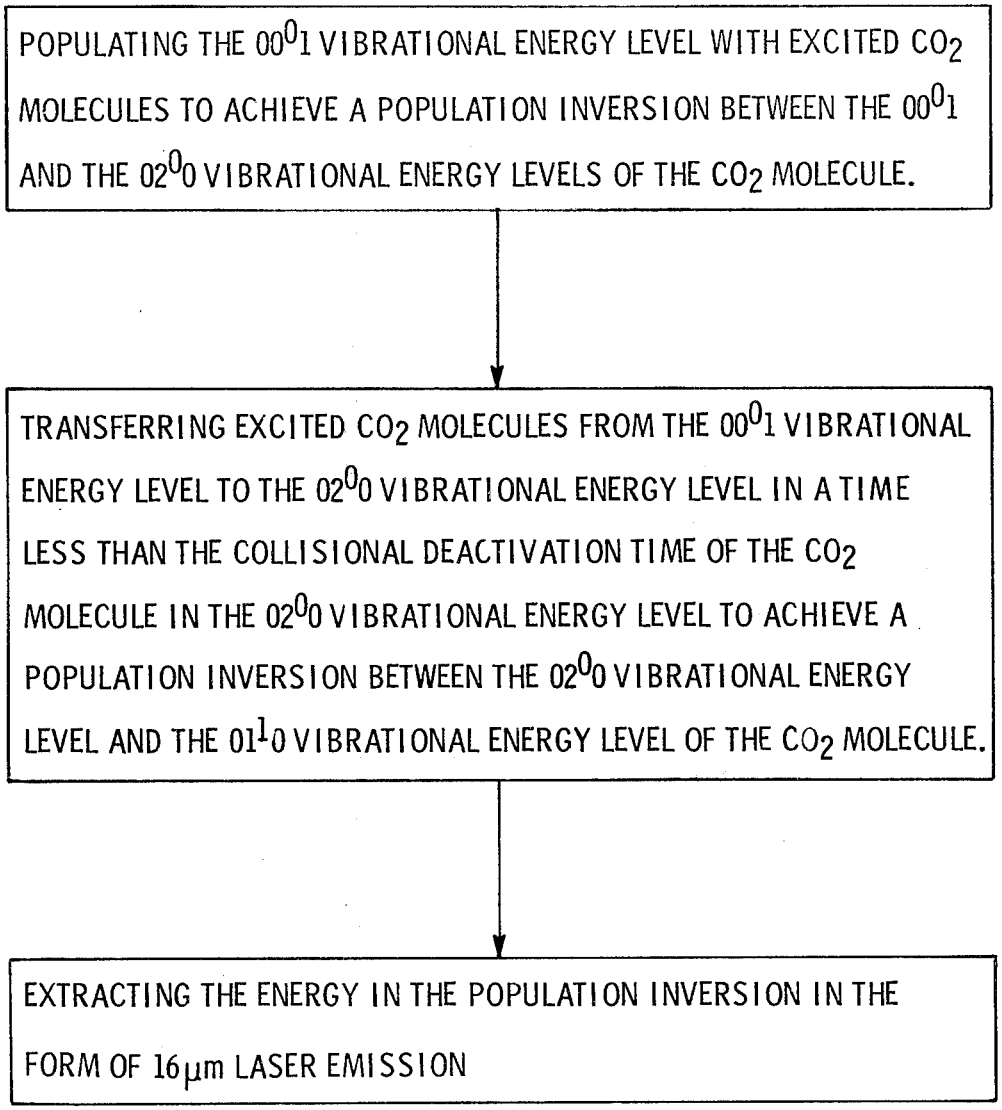

The flow charts of FIGS. 2A and 2B describe the basic process steps for achieving the 14 $\mu$m and 16 $\mu$m laser action described above.

The subsequent discussion, with reference to FIGS. 3, 4, 5, 6 and 7 discloses embodiments for satisfying the steps identified above to produce 14 $\mu$m or 16 $\mu$m laser radiation from $CO_2$ molecular transitions between the $CO_2$ ($10^00$) and $CO_2$ ($01^10$) levels or the $CO_2$ ($02^00$) and $CO_2$ ($01^10$) levels respectively. Reference to 9.4 $\mu$m radiation is intended to refer to all wavelengths generated by all allowed transitions between rotational states of the $00^01$ vibrational level and rotational states of the $02^00$ vibrational level of the $CO_2$ molecule while reference to 16 $\mu$m radiation is intended to refer to wavelengths of all allowed transitions between rotational states of the $02^00$ vibrational level and rotational states of the $01^10$ vibrational level of the $CO_2$ molecule. Similarly, reference to 10.6 $\mu$m radiation is intended to refer to all wavelengths of allowed transitions between rotational states of the $00^01$ vibrational level and rotational states of the $10^00$ vibrational level of the $CO_2$ molecule; and reference to 14 $\mu$m radiation is intended to refer to wavelengths of all allowed transitions between rotational states of the $10^00$ vibrational level and rotational states of the $01^10$ vibrational level.

Optical Pumping Mode

The process steps of FIG. 2B recite a technique to obtain 16 $\mu$m laser radiation from a $CO_2$ laser medium. Pumping of the $CO_2$ ($00^01$) level by absorption of radiation produced by an external source is one method of excitation. A medium of pure $CO_2$ may be used provided an efficient source is available at a wavelength coincident with an absorption line of the $CO_2$. At least one emission line of an HBr laser at approximately 4.23 $\mu$m is strongly absorbed by $CO_2$ and could be used. However, the short optical depth associated with the strong absorption limits the size of the volume which can be excited. Excitation of the $00^01$ level, could also be achieved by standard flash-lamp techniques known in the art. Such techniques require optical band-pass filters at the $00^01$ resonance to eliminate undesired excitation of the other vibrational levels.

The most effective method of optical pumping is to use an energizing gas as the optical absorption medium. The addition of such a gas constituent to the $CO_2$ laser medium will permit use of laser radiation to optically excite the resonant state of the energizing gas. Characteristics of a suitable energizing gas include:

(1) A resonant energy level near the $CO_2$ ($00^01$) state, preferably within the average kinetic energy in the gas (about $100^{-1}$ cm) so that efficient collisional transfer of the energy to the $CO_2$ ($00^01$) state may occur;

(2) A resonant energy level, which is an absorption line of an available laser; and (3) A vapor pressure such that densities comparable to that of to $CO_2$ gas exist at the anticipated operating temperatures.

Suitable energizing gases are DF, HBr, and HCl, each of which may be pumped efficiently by laser radiation in the 4–5 $\mu$m range from a DF, HBr, or HCl chemical laser, respectively. An alternative method is to use CO as an energizing gas, exciting it with frequency-doubled radiation from the $CO_2$ transition producing 9.4 $\mu$m by means of standard non-linear optics known in the art. In the case where 16 $\mu$m emission on transitions in $CO_2$ isotopes other than $C^{12}O_2^{16}$ are desired, the $C^{12}O_2^{16}$ would be used as an energizing gas in conjunction with the previously mentioned transition of an HBr laser.

While in addition of other gas constituents to the $CO_2$ laser medium are helpful, their beneficial effects are nominal. A gas such as He, which rapidly collisionally deactivates the $01^10$ vibrational level with respect to deactivation of the other vibrational levels of the $CO_2$ molecule, and provides a thermal bath to limit temperature rise may be beneficial if the pumping of levels other than the $CO_2$ ($00^01$) level cannot be avoided. The deactivation process:

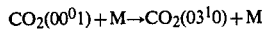

$$CO_2(00^01) + M \rightarrow CO_2(03^10) + M$$

where M is the one of the gas constituents, will ultimately increase the population in the $01^10$ level as the $CO_2$ molecules in the $03^10$ state are redistributed among all the bending modes according to a Boltzmann distribution. However, the selective pumping of the $00^01$ level by optical means makes deactivation of the $01^10$ level not nearly as critical as in other pumping techniques, which are not as selective as direct excitation of $CO_2$ by electrical discharge. Use of $N_2$ has little beneficial effect, in that it is not excited by the optical pumping pulse, nor does it aid in populating the $00^01$ vibrational level.

An optionally pumped system will produce laser radiation at gas temperatures near room temperature as there is relatively little increase in the population of the $01^10$ level by the excitation process. However, increased efficiencies will result from operation at lower temperatures. Minimum temperatures in a static system are determined by the desired vapor pressure of the $CO_2$ or energizing gas. At pressures of 1 Torr, $CO_2$ condenses at approximately 135° K.

Figure 3:
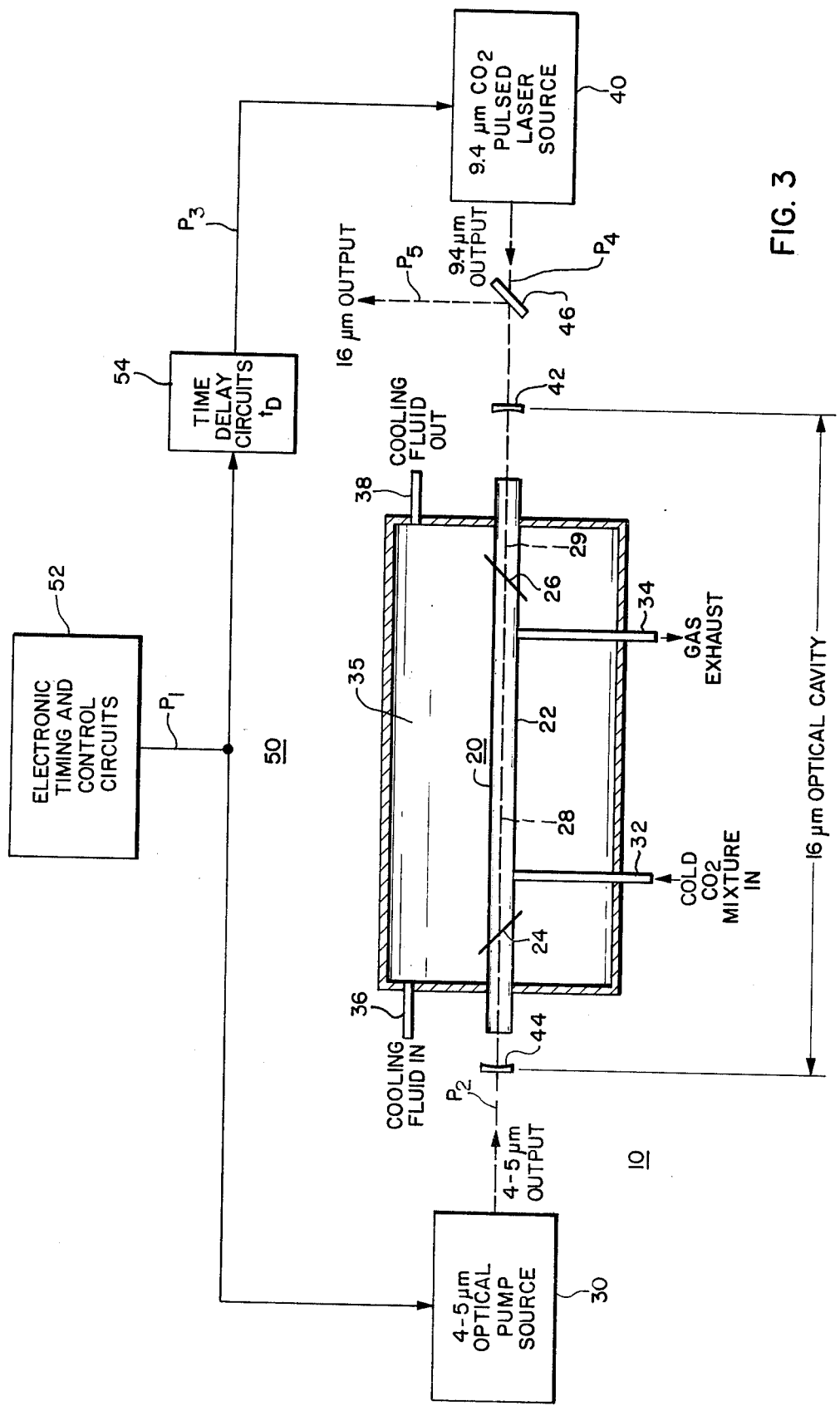
FIG. 3 is a schematic illustration of laser apparatus for generating either 14 μm or 16 μm laser radiation using optical pumping.

A typical embodiment of the inventive concept in an optically pumped $CO_2$ laser apparatus is schematically illustrated in FIG. 3.

Laser apparatus 10 consists primarily of optical cavity 20, a 4–5 $\mu$m optical pump source 30, a 9.4 $\mu$m $CO_2$ laser pulse source 40, and electronic timing circuits 50. The optical cavity 20 consists of an absorption cell 22 having Brewster windows 24 and 26 positioned to define a discharge region 28 there between and an optical path 29. The $CO_2$ gas mixture flows through the discharge region 28 via tubes 32 and 34. The absorption cell 22 and the $CO_2$ gas mixture are cooled by a liquid coolant flowing through the cooling bath 35, via pipes 36 and 38. Mirrors 42 and 44 are arranged along the optical path 29 and form a 16 $\mu$m optical cavity. Mirror 44 is partially transmitting between 4 $\mu$m and 5 $\mu$m and exhibits low reflectivity at 9.4 $\mu$m and high reflectivity at 16 $\mu$m. Mirror 42 is a dichroic mirror which is partially transmitting at 9.4 $\mu$m and partially transmitting at 16 $\mu$m. The 4–5 $\mu$m optical pump source 30 is arranged so that its output passes through mirror 44 and along the optical path 29. The 9.4 $\mu$m pulsed laser source 40 is arranged so that its output passes through the dichroic beam splitter 46 and through the dichroic mirror 42 along the optical path 29. The dichroic beam splitter 46 is partially transmitting at 9.4 $\mu$m and highly reflecting at 16 $\mu$m to extract the 16 $\mu$m laser output. The timing circuits 50 consist of an electronic timing circuit 52 and a delay circuit 54.

Figure 4:
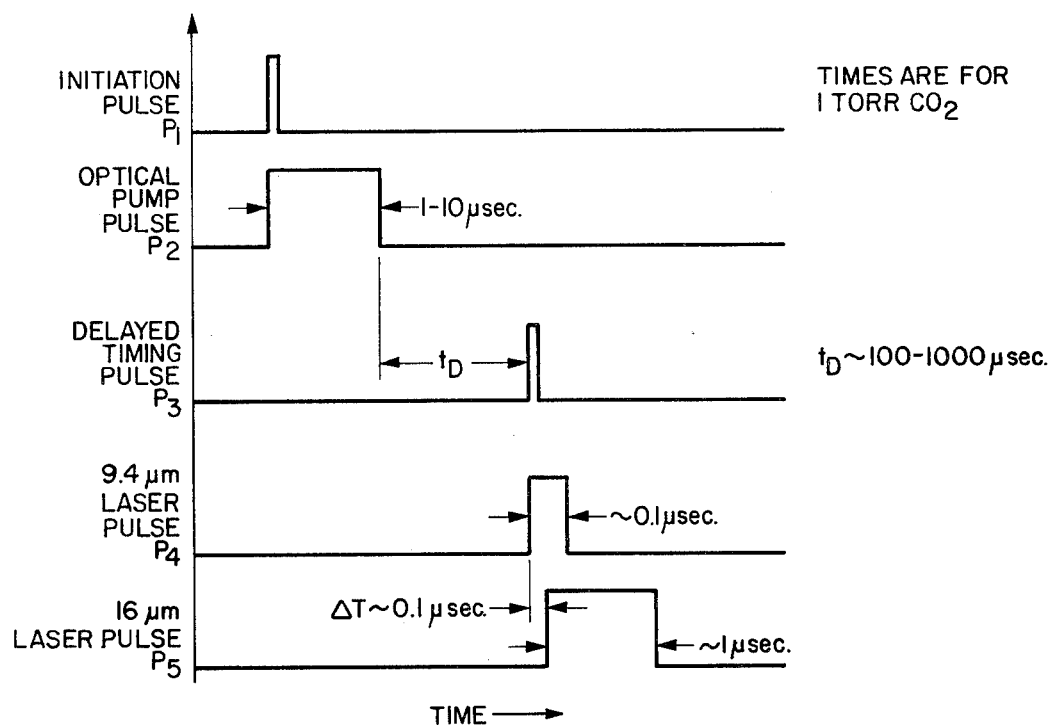
FIG. 4 is a pulse graph illustrating the operation of the embodiment of FIG. 3.

The laser apparatus 10 operates in accordance with the teaching of this disclosure in the following manner. The mixture of $CO_2$ in absorption cell 22 is cooled by cooling bath 35 to reduce the population of the $CO_2$ ($01^10$) level. The optical pump source 30 emits laser radiation which passes through the absorption line of the $CO_2$ or the energizing gas contained in cell 22. The $CO_2$ is excited to the $00^01$ level directly by absorption of the pump radiation or by collisional transfer from the energizing gas which was pumped by the 4–5 $\mu$m optical pump source 30. After a short time determined by time delay circuit 54, the 9.4 $\mu$m output of the $CO_2$ pulsed laser source 40 causes the transfer of population from the $CO_2$ ($00^01$) level to the $CO_2$ ($02^00$) level. The time delay $t_D$ between the end of the optical pump pulse $P_2$ and the beginning of the transfer pulse $P_4$ as illustrated in the pulse graph of FIG. 4 is determined by the time required for the $CO_2$ ($00^01$) level to come to equilibrium with the corresponding energy level of the energizing gas. After a population inversion is created by the transfer of population to the $02^00$ level, the 16 μm laser radiation builds up in the optical cavity 20 formed by mirrors 42 and 44. The fraction of the 16 μm laser radiation in the optical cavity which passes through the partially transmitting mirror 42 is deflected out of the main optical path by dichroic beam splitter 46.

The timing circuits 50 control the sequence of operation of the 4–5 μm optical pump source 30 and the 9.4 μm $CO_2$ pulsed laser source 40. The electronic timing circuit 52 puts out a pulse $P_1$ which triggers the optical pump source 30. Optical pump source 30 responds to pulse $P_1$ by emitting a 4–5 μm laser pump pulse $P_2$. Pulse $P_1$ also triggers the time delay circuit 54 which functions to delay pulse $P_1$ for a predetermined time and generate a delayed pulse $P_3$ which triggers the 9.4 μm $CO_2$ laser source 40 in accordance with the pulse graph of FIG. 4. Laser source 40 responds to the delayed pulse $P_3$ by emitting a 9.4 μm laser pulse $P_4$. Typical times for pulses $P_1$ through $P_5$ are noted on FIG. 4.

An alternate embodiment may position the optical pump source 30 so that its pump pulse enters optical cavity 20 on the same side as the 9.4 μm $CO_2$ pulsed laser source 40, thereby requiring a trichroic mirror and beam splitter in place of dichroic mirror 42 and beam splitter 46.

An alternate embodiment may extract 16 μm laser radiation from the active medium by means of an amplifier configuration in which mirrors 42 and 44 are removed and an external source of 16 μm radiation is applied along the optical path 29 by means of an additional dichroic mirror, partially transmitting at 9.4 μm and highly reflecting at 16 μm, placed in the optical path 29 in the position of mirror 44. The external 16 μm source is triggered by a pulse generated by the circuits 52 and 54 at a time corresponding to pulse $P_5$.

An alternate embodiment may extract 16 μm laser radiation from the active medium by means of an optical cavity which is Q-switched at 9.4 μm and 16 μm. In this configuration, the 9.4 μm source 30 is removed. The optical cavity formed by mirrors 42 and 44 is Q-switched by means known in the art such as rotating mirror 44 at high speed, blocking the optical path 29 by means of a chopper placed within the optical cavity, formed by mirrors 100 and 102 or by means of a CdTe electrooptical modulator placed in the optical path 29 between mirrors 42 and 44. For this configuration mirrors 42 and 44 will be highly reflecting at 9.4 μm, mirror 44 will be highly reflecting at 16 μm and mirror 42 will be partially transmitting at 16 μm and partially transmitting at 4–5 μm. The output pulse $P_3$ of delay circuit 54 will be used to initiate the Q-switching action leading to subsequent laser output at 16 μm.

A laser system for generating 14 μm laser radiation is similar. Inasmuch as the 14 μm laser radiation is produced by a transition between the $10^00$ and $01^10$ levels of the $CO_2$ molecule, the wavelength of radiation from the $CO_2$ pulsed laser source 40 must be approximately 10.6 μm. Dichroic mirror 42 and beam splitter 46 must be capable of transmitting the 10.6 μm radiation while having a high reflectance at 14 μm. Mirror 44 must also have high reflectance at 14 μm. Pulse $P_1$ also triggers the time delay circuit 54 which functions to delay pulse $P_1$ for a predetermined time and generates a delayed pulse $P_3$ which triggers the 9.4 μm $CO_2$ laser source 40 in accordance with the pulse graph of FIG. 4. Laser source 40 responds to the delayed pulse $P_3$ by emitting a 9.4 μm laser pulse $P_4$.

Electrical Excitation Mode

Electrical excitation in an electrical discharge is another method for exciting the $CO_2$ ($00^01$) level. However, the electrical excitation process also excites other levels of the $CO_2$ molecule, in particular the $CO_2$ ($01^10$) level. Thus, the use of electrical excitation to pump the $CO_2$ ($00^01$) level requires additional gas constituents to control the population of the $01^10$ level. Included in the $CO_2$ mixture is an energizing gas which has a greater probability of being excited by electron collisions than the $CO_2$.

Qualities of a suitable energizing gas include:

(1) a gas with an energy level at near resonance with the $00^01$ vibrational level of the $CO_2$ molecule, preferably slightly above that level, but within an energy associated with the kinetic temperature of the gas (approximately $100^{-1}$ cm at 150° K.); near resonance is essential if efficient transfer of the energy from the energizing gas to the $00^01$ state of $CO_2$ is to occur by collisional transfer;

(2) a gas with an excitation rate into the near resonant level which is greater than the excitation rate into the $CO_2$ ($00^01$) level, i.e. a cross section for electron impact which is greater than the cross section of $CO_2$ for electron impact so that it is preferentially excited by the electron collisions; and (3) a gas which is compatible with operation of the electrical discharge over an extended volume so that collisional transfer of the energy to the $CO_2$ ($00^01$) level will occur throughout the volume and uniform excitation of the $CO_2$ molecule to the $00^01$ level will occur throughout the laser medium.

Nitrogen, $N_2$, is an example of an effective energizing gas; the first vibrational level of $N_2$ is in near energy resonance with the $CO_2$ ($00^01$) level, the vibrational excitation rate is larger than that for $CO_2$ ($00^01$), and diffuse discharges are easily excited. Carbon monoxide, CO, is also acceptable. However, it is less desirable than $N_2$ in that its resonance is further from the $CO_2$ ($00^01$) level than $N_2$. The gases, HBr, HCl, and DF which are effective energizing gases for optical pumping are less effective for electrical excitation as well as tending to form constricted electrical discharges.

Operation of a $CO_2$ gas laser system in the direct electrical excitation mode may be realized in the absence of an energizing gas. However, the presence of such a gas will be advantageous since the population of the $CO_2$ ($00^01$) level will be preferentially increased compared to a system without such gas, provided sufficient time is available during or after the excitation pulse such that equilibrium is established between the excited levels of the $CO_2$ and energizing gas. The energy deposited in the energizing gas by the excitation pulse will be selectively transferred to the $CO_2$ ($00^01$) state through collisional transfer mechanisms, thereby increasing the population of the $00^01$ level of the $CO_2$ molecule until equilibrium between the near resonant levels of the $CO_2$ and the energizing gas mixture is reached. The use of an energizing gas effectively increases the excitation rate of the $CO_2$ to the $00^01$ level without changing the excitation rates to other $CO_2$ levels.

As additional amounts of energizing gas are added to the laser medium, the effective excitation rate of the $CO_2$ after the equilibrium has been reached will approach the excitation rate of the energizing gas alone. For $N_2$, this saturation begins when the density of $N_2$ is approximately 4 times that of $CO_2$. Because the energy stored in the $N_2$ gas after equilibrium is largely inaccessible during the time required for the transfer step, additional amounts of $N_2$ such that the ratio of $N_2$ to $CO_2$ is much in excess of 4 will result in a declining efficiency of the laser. As excessive amounts of $N_2$ are added, deactivation of the $CO_2$ ($00^01$) level occurs by means of the process:

$$CO_2(00^01) + N_2 \rightarrow CO_2(03^10) + N_2$$

This will increase the parameter of the $CO_2$ ($03^11$) as previously noted. These detrimental effects will typically limit the preferred amount of $N_2$ used to approximately 4 times that of $CO_2$ or less.

If an electrical discharge pulse is applied directly to the $CO_2$ laser medium, the pulse will excite the $01^10$ vibrational energy level as well as the $CO_2$ ($00^01$) level. To establish the conditions for 16 $\mu$m laser emission, it is essential that a gas constituent or gas constituents be added to selectively reduce the population of the $CO_2$ ($01^10$) level prior to the application of the transfer pulse. Two aspects are important in this process. The first is the rapid and selective relaxation of the population of the $CO_2$ ($01^10$) level towards thermal equilibrium and the second is the redistribution of the dissipated energy such that the temperature rise is minimized. Both aspects may be satisfied by a single gas or each by separate gases. A gas with the characteristics of selective relaxation will be referred to as a "relaxing" gas and a gas with characteristics as a heat sink will be referred to as a buffer gas. Desirable qualities of the relaxing gas include:

(1) effectiveness in collisionally deactivating the $01^10$ lower lasing level of the 16 $\mu$m transition;

(2) a rate of collisional deactivation of the $00^01$ vibrational level of $CO_2$ slower than the deactivation rate of the $01^10$ level; and (3) presence in a vapor phase at the temperature operation of the discharge;

(4) compatibility with excitation of diffuse discharges.

Desirable characteristics of the buffer gas include:

(1) a small cross section for collisional deactivation of the $CO_2$ ($00^01$);

(2) large vapor pressure at the operating temperature of the discharge; and (3) compatibility with efficient excitation of diffuse discharges.

Helium, He, has characteristics which make it both an effective relaxing gas and a buffer gas. Hydrogen, $H_2$, has a larger cross section for deactivation of the $CO_2$ ($01^10$) level, but also deactivates the $CO_2$ ($00^01$) level. Small amounts of $H_2$ in addition to He may be advantageous. Water, $H_2O$, is also an effective relaxing gas but has a low vapor pressure below 0° C. The other noble gases are less effective than He as relaxing and buffer gases. Argon, krypton and xenon tend to produce constricted discharges when present as a major gas constituent.

The amount of helium added to the $CO_2$ laser gas mixture depends on the following competing processes:

$$CO_2(00^01) + He \rightarrow CO_2(03^10) + He \quad (1)$$

$$CO_2(00^01) + CO_2(00^00) \rightarrow CO_2(03^10) + CO_2(00^00) \quad (2)$$

$$CO_2(01^10) + He \rightarrow CO_2(00^00) + He \quad (3)$$

$$CO_2(01^10) + CO_2(00^00) \rightarrow 2CO_2(00^00) \quad (4)$$

Present understanding of the above mechanisms indicate that process 2 and 4, which occur in pure $CO_2$, occurs at approximately the same rate, so that decay of the $01^10$ vibrational level will not occur rapidly relative to decay of the $00^01$ level in pure $CO_2$. For small amounts of He, however, process 3, which will collisionally deactivate the $01^10$ vibrational level of $CO_2$ by reducing its energy to the ground state $00^00$, will occur at approximately 20 times the rate that process 4 will occur, thereby significantly increasing the deactivation of the $01^10$ level for small amounts of He. Although the addition of small amounts of He to the $CO_2$ laser mixture beneficially reduces the population of the $01^10$ vibrational level according to process 3, this process is in competition with process 1 whereby the He collisionally deactivates the first lasing level, the $00^01$ vibrational level. Although this process tends to populate the higher bending modes of the $CO_2$ molecule, the $03^10$ level in particular, the population of these modes, due to coupling between all the bending modes, will tend to distribute itself according to a Boltzmann distribution, thereby having the additional detrimental effect of increasing the population of the $01^10$ vibrational level. For small amounts of He, however, process 3 occurs at approximately 100 times that of process 1 so the detrimental effect is nominal.

The effect of the above competing processes suggest that beneficial effects of He outweigh its detrimental effects for small amounts of He. Inasmuch as process 3 occurs at 20 times that of process 1, the effect of He collisionally deactivating the $01^10$ level will become important when its concentration is approximately 1/20th that of $CO_2$.

Inasmuch as it is preferred to have the deactivation of the $01^10$ level occur at least 10 times faster than the deactivation of the $00^01$ level, this suggests ratios of He to $CO_2$ of at least 1/2:1. While increasing the amounts of He beyond the 1/2:1 ratio will increase the deactivation of the $01^10$ level, the detrimental effects of higher ratios become significant when the rate of process 1 approximately equals the rate of process 2 in pure $CO_2$. Inasmuch as process 1 occurs at approximately 4 times the rate of process 2, a ratio of He to $CO_2$ to 8:1 is such that the detrimental effect of the He takes on significance. Increasing the helium content substantially beyond 20:1 increases the deactivation rate of the $00^01$ level and increases the heat load on the $01^10$ level though coupling of the bending modes, both of which are adverse results.

The temperature at which the laser is operated is directly related to the efficiency of operation. Lower temperatures tend to reduce the population of the $01^10$ vibrational level and minimize threshold requirements. In a laser system using a static or subsonic flowing $CO_2$ gas mixture, the minimum temperature is determined by the condensation of the $CO_2$ at the desired operating pressure. At pressures of 1 Torr, this occurs at approximately 135° K. The kinetic temperature can be reduced further by operation in supersonic flow.

Figure 5:
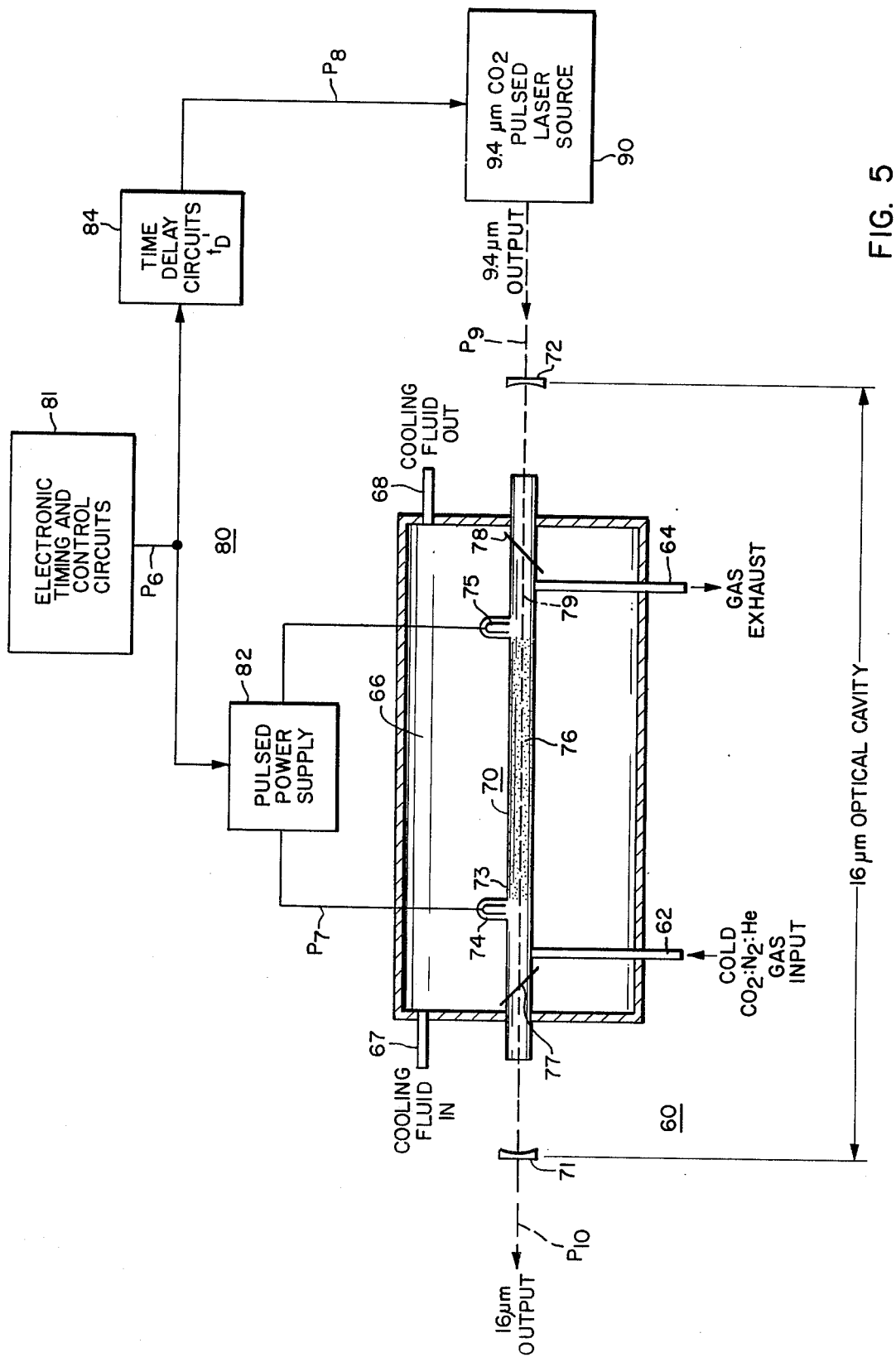
FIG. 5 is a schematic of laser apparatus for generating 14 μm and 16 μm laser radiation by using electrical excitation.

An implementation of the direct electrical excitation mode of operation of the inventive concept is schematically illustrated in FIG. 5. Laser apparatus 60 includes an optical cavity 70 and a timing circuit 80. The optical cavity 70, as defined by mirrors 71 and 72, consists of an electrical discharge tube 73 having electrodes 74 and 75 disposed at opposite ends thereof to define an electrical discharge region 76 therebetween. The electrical discharge tube 73 is sealed at its ends by Brewster windows 77 and 78. A laser gas mixture consisting of carbon dioxide, nitrogen, and helium is directed into the tube 73 through pipe 62 and exhausted from the discharge tube through pipe 64. The gas is cooled before entering the discharge region 76. The longitudinal axis of the discharge tube defines the optical path 79. Mirrors 71 and 72 are positioned such that the optical cavity 70 has a high reflectivity at 16 $\mu$m. Mirror 72 is partially transmitting at 9.4 $\mu$m. Mirror 71 is partially transmitting at 16 $\mu$m. The discharge tube 73 is cooled with a cooling bath 66. Cooling fluid enters cooling bath 66 through pipe 67 and exits through pipe 68. A 9.4 $\mu$m transfer laser pulse is applied along the optical path 79. This laser pulse is obtained from the 9.4 $\mu$m $CO_2$ pulsed laser source 90 such as a Lumonics Model Series 100. The discharge tube 73 in the optical cavity 70 is excited by a pulsed power supply 82. The timing circuit 80 consists of conventional circuits which generate timing pulses and delays in accordance with the pulse graph of FIG. 6 to control the sequence of operation of the pulsed power supply 82 and the 9.4 $\mu$m $CO_2$ laser 90.

Figure 6:
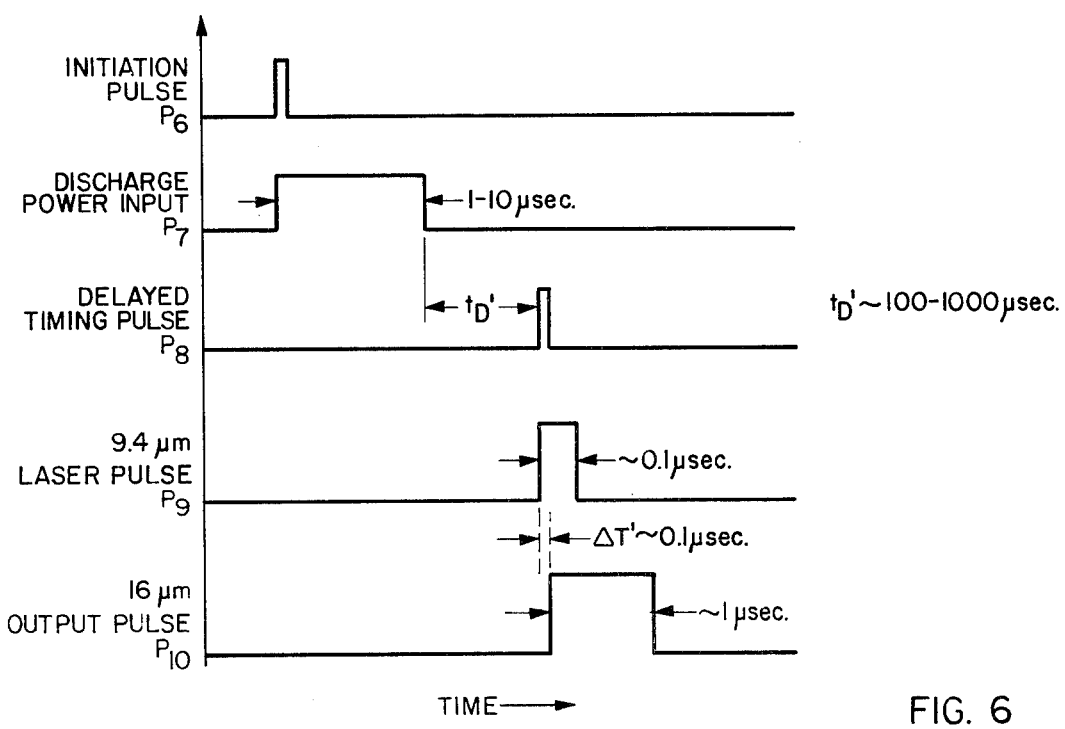
FIG. 6 is a pulse graph illustrating the operation of the embodiment of FIG. 5.

Laser apparatus 60 operates according to the teachings of this disclosure in the following manner. The $CO_2$ laser gas mixture in discharge tube 72 is cooled by cooling bath 66. This reduces the population of the $01^10$ level. The pulsed power supply 82 produces an electrical discharge in discharge tube 73 between electrodes 74 and 75 which discharge excites the $CO_2$ to the $00^01$ level and the $N_2$ to its first vibrational level. A fraction of the population which reaches the first vibrational level of nitrogen is transferred to the $CO_2$ ($00^01$) level so as to increase its population. The electrical excitation pulse also excites the $01^10$ level. Before application of the 9.4 $\mu$m transfer pulse, a time delay $t_D$, as illustrated in the pulse graph of FIG. 6, is initiated to allow the $01^10$ population to relax towards a value determined by the temperature of the cooling bath. The 9.4 $\mu$m pulse from the laser source 90 is then applied to the excited gas in the discharge tube 73 in order to transfer population from the $00^01$ level of $CO_2$ to the $02^00$ level of $CO_2$. This creates an inversion on the 16 $\mu$m laser transitions. The 16 $\mu$m laser flux subsequently builds up in the cavity formed by mirrors 71 and 72. A fraction of the 16 $\mu$m radiation in the optical cavity 70 is extracted through the partially transmitting mirror 71.

Timing circuits 80 control the sequence of operation of the pulsed power supply 82 and the 9.4 $\mu$m $CO_2$ laser 90. Pulse $P_6$ from the pulse circuits 81 triggers the pulsed power supply 82 and the time delay circuit 84. The pulse power supply 82 operates in accordance with the prior art to generate a pulse $P_7$ which excites an electrical discharge in the discharge region 76 via electrodes 74 and 75. The time delay circuit 84 delays pulse $P_6$ until a time $t_D$, after the end of the pulse $P_7$ and then generates pulse $P_8$ which is applied to the 9.4 $\mu$m pulsed laser source 90. Laser source 90 responds by transmitting a 9.4 $\mu$m laser pulse $P_9$ into the discharge tube 73 to produce a 16 $\mu$m laser output pulse $P_{10}$. The output laser pulse $P_{10}$ may be delayed by a small amount $\Delta T'$ from that of $P_9$ because of build-up time in the optical cavity 70. Typical times for pulses $P_6$ through $P_{10}$ are noted on the pulse graph FIG. 6.

A laser system for generating 14 $\mu$m laser radiation is similar. Inasmuch as the 14 $\mu$m laser radiation is produced by a transition between the $10^00$ and $01^10$ levels of the $CO_2$ molecule, the wavelength of radiation from the $CO_2$ pulsed laser source 90 must be approximately 10.6 $\mu$m. Dichroic mirror 72 must be partially transmitting at 10.6 $\mu$m, and dichroic mirror 71 must be partially transmitting at 14 $\mu$m.

An alternate embodiment may have electrodes 74 and 75 placed in discharge tube 73 and extending along the optical path 79 such that current flow in the electrical discharge tube 73 is transverse to the optical path 79.

An alternate embodiment may cool the $CO_2$ laser gas by flowing the gas through a heat exchanger or by expansion into supersonic flow prior to entering the discharge tube 73 replacing the cooling bath 66.

Alternate embodiments involving the optical cavity and extraction system may be used. These embodiments include configurations using amplifier techniques or self-excitation with Q-switching as discussed in the optical pumping mode embodiment.

With ratios of $N_2:CO_2$ on the order of 5:1, an alternate method of operation of the direct electrical excitation mode is possible. After the first series of pulses shown in FIG. 6 have occurred, a second laser pulse may be obtained without an additional initiating pulse $P_6$ or an electrical discharge pulse $P_7$. This is possible because the initial transfer pulse $P_9$ reduces the population of the $00^01$ level of the $CO_2$ molecule, thereby displacing the population of the $00^01$ level from equilibrium with the population of the near resonant level of the energizing gas. Since the energizing gas acts as an energy reservoir, energy is transferred to the $00^01$ level of the $CO_2$ molecule by collisional transfer, thereby eliminating the requirement of a second electrical discharge pulse $P_7$. Application of a second laser transfer pulse $P_9$ after a time $t_D$, will result in generation of 16 $\mu$m laser emission $P_{10}$.

Flow Mixing Mode

The excitation of the $01^10$ level by electron impact in addition to the desired $00^01$ level places stringent requirement on the temperature of operation of the 16 $\mu$m laser. An approach which reduces the problems associated with the excitation of the $01^10$ level is to separate in space the electrical excitation of the energizing gas and the optical cavity. If the nitrogen is excited in a flowing gas stream, carbon dioxide can be added downstream from the electrical discharge and excited by transfer from the first vibrational level of nitrogen to the $00^01$ level of $CO_2$. The gas stream containing the excited $CO_2$ in the $00^01$ level then flows through the optical cavity from which laser emission of 16 $\mu$m can be extracted. This technique avoids the necessity of having $CO_2$ in the electrical discharge itself. Since reducing the population in the $01^10$ level is still desirable, cooling of the flowing gas stream would be desirable. The gas may be pre-cooled and operated in subsonic flow or it may be operated at higher temperatures and expanded through a nozzle into supersonic flow to obtain the necessary cooling.

Figure 7:
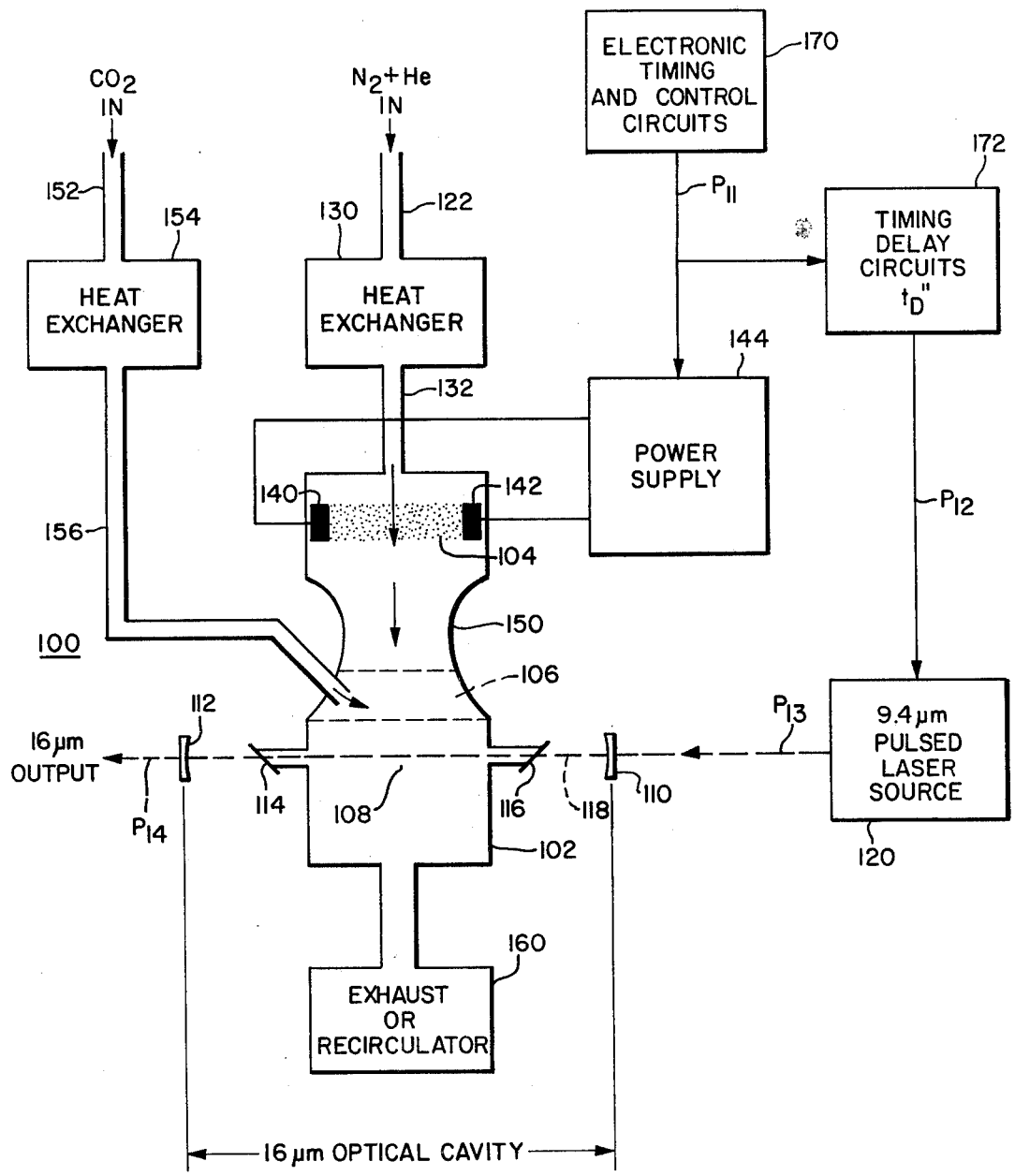
FIG. 7 is a schematic illustration of an alternative apparatus for generating 14 μm and 16 μm laser radiation by using flow mixing of the $CO_2$ gas and an energizing gas.

FIG. 7 shows laser apparatus 100 in which flow mixing is used to provide the excited $CO_2$ in the $00^01$ level. This is an alternative technique to the excitation described in laser apparatus 60 of FIG. 5. The laser excitation and extraction is accomplished in the chamber 102 which consists of an electrical discharge region 104, a mixing region 106, and an optical extraction region 108.

The optical extraction region 108 consists of an optical cavity formed by mirrors 110 and 112. The extraction region is closed by Brewster windows 114 and 116. The mirrors and Brewster windows are aligned along optical path 118. The 9.4 $\mu$m pulsed laser source 120 is arranged along the optical path 118 so as to apply a 9.4 $\mu$m laser pulse through mirror 110 into the extraction region 108. Nitrogen and helium enter the system through pipe 122 and are cooled in heat exchanger 130. The cooled nitrogen-helium mixture passes into the discharge region 104 through pipe 132. The electrical discharge is formed between electrodes 140 and 142 which are excited by power supply 144. The electrical discharge and power supply may be pulsed or continuous. The nitrogen and helium gas stream containing excited nitrogen flows out of the discharge region 104 and enters the mixing region 106. Nozzle 150 or an array of nozzles may be used to provide additional cooling by expanding the gas into supersonic flow in the mixing region 106 and the extraction region 108. $CO_2$ enters through pipe 152 into heat exchanger 154 where it is cooled. The cold $CO_2$ passes through pipe 156 and enters the mixing region 106 where it is mixed with the gas stream containing excited nitrogen. The gas stream containing excited nitrogen and excited $CO_2$ in the $00^01$ state flows through the extraction region 108 and is then either exhausted or recirculated by the recirculation system 160. Timing and control pulses are generated by timing circuit 170 and time delay circuit 172. These pulses are applied to the power supply 140 so as to generate a discharge and through the time delay circuit 172 to the 9.4 $\mu$m pulsed laser source 120. For pulsed operation of the power supply 144, the pulse shapes $P_{11}$ through $P_{14}$ are similar to those described in connection with the optical excitation in FIG. 4. The time delay previously referred to as $t_D$ and $t_D$, is now the time required for the gas to pass from the electrical discharge region 104 to the optical extraction region 108. For CW operation of power supply 144 and the discharge, timing circuit 170 triggers the pulsed laser source 120 directly. Time delay circuit 172 is not required for CW operation of the discharge.

Laser apparatus 100 operates in accordance with the teachings of disclosure in the following manner. Nitrogen is excited to its first vibrational level in the electrical discharge formed by electrodes 140 and 142. $CO_2$ is mixed with this excited nitrogen in a flowing gas stream. The $CO_2$ is excited to the $00^01$ level by collisions with the excited nitrogen. The conditions for establishing a small population on the $CO_2$ ($01^10$) level are obtained either by cooling the nitrogen-helium gas stream by heat exchanger 154 or by expanding the nitrogen-helium mixture through nozzle 150 into supersonic flow. The 9.4 $\mu$m pulsed laser source 120 causes a transfer of the population from the $CO_2$ ($00^01$) level to the $CO_2$ ($02^00$) level to create an inversion between the $01^10$ and the $02^00$ levels of the $CO_2$ molecule. The resulting laser radiation builds up in the cavity formed by mirrors 110 and 112 and is extracted through the partially transmitting mirror 112.

A laser system for generating 14 $\mu$m laser radiation is similar. Inasmuch as the 14 $\mu$m laser radiation is produced by a transition between the $10^00$ and $01^10$ levels of the $CO_2$ molecule, the wavelength of radiation from the $CO_2$ pulsed laser source 120 must be approximately 10.6 $\mu$m. Dichroic mirror 110 must be partially transmitting at 10.6 $\mu$m, and dichroic mirror 112 must be partially transmitting at 14 $\mu$m.

Alternate embodiments involving the optical cavity may be used. These embodiments are as described in the discussion of FIGS. 3 and 4. These embodiments include configurations using amplifier techniques or self-excitation with Q-switching as discussed in the optical pumping mode embodiments.

I claim as my invention:

1. In a method of operating a $CO_2$ gas laser apparatus to produce 16 micron laser radiation wherein excitation of the $CO_2$ gas laser medium in an electrical discharge region populates the $00^01$ vibrational energy level with excited $CO_2$ molecules to achieve a population inversion between the $00^01$ and the $02^00$ vibrational energy levels of the $CO_2$ molecule, the excited $CO_2$ molecules being then transferred from the $00^01$ vibrational energy level to the $02^00$ vibrational energy level to achieve a population inversion between the $02^00$ vibrational energy level and the $01^10$ level of the $CO_2$ molecules, said latter population inversion supporting the extraction of 16 micron laser radiation, an improvement comprising the steps of, mixing $CO_2$ and $N_2$ to produce said gas laser medium, said $N_2$ constituent functioning as an energizing gas to excite said $CO_2$ molecules at the $00^01$ vibrational energy level in response to direct electrical excitation of said gas laser medium, directly cooling the gas laser medium of $CO_2$ and $N_2$ to a predetermined gas kinetic temperature, flowing said cooled gas laser medium through the electrical discharge region of the laser apparatus, electrically exciting said gas laser medium via direct electrical discharge excitation, delaying the transfer between the $00^01$ and the $02^00$ energy levels of the $CO_2$ molecules for a time after the electrical excitation of said gas laser medium which is sufficient to allow the population of the $01^10$ vibrational energy level of the $CO_2$ molecules to substantially relax to the population value of said predetermined gas kinetic temperature, and transferring the excited $CO_2$ molecules, after said delay, from the $00^01$ level to the $02^00$ level by stimulated emission.

2. In a method as claimed in claim 1 further including the step of mixing He with said $CO_2$ and $N_2$ to form said gas laser medium, said He constituent functioning to depopulate the $01^10$ vibrational energy level of the $CO_2$ molecules to enhance the population inversion between the $02^00$ level and the $01^10$ level.

3. In a method as claimed in claim 1 wherein the relaxing of the population of the $01^10$ vibrational energy level results in a rise in the kinetic temperature of the gas laser medium, further including the step of, mixing He with the $CO_2$ and the $N_2$ to form said gas laser medium to enhance the relaxation process of the population of $01^10$ vibrational energy level and to minimize the rise in the gas kinetic temperature resulting from the relaxation process.

4. In a method as claimed in claim 1 wherein said predetermined gas kinetic temperature is approximately 150° K.

5. In a method as claimed in claim 1 further including the step of collisionally deactivating the $01^10$ vibrational energy level of the $CO_2$ molecules at a rate which is faster than the rate of collisional deactivation of the $00^01$ vibrational energy level of the $CO_2$ molecule by mixing He with the $CO_2$ and $N_2$ to form said gas laser medium.

6. A method as claimed in claim 1 wherein said step of transferring is accomplished by stimulated emission using laser radiation at approximately 9.4 μm.

7. A $CO_2$ gas laser apparatus for producing 16 micron laser radiation comprising, an optical cavity including optical reflecting elements terminating each end of said cavity, a gas laser medium consisting of $CO_2$, $N_2$ and He, means for flowing said gas laser medium through said optical cavity, an electrode assembly including first and second spaced-apart electrodes defining a discharge region therebetween, a DC excitation means connected to said first and second electrodes to electrically excite the $CO_2$ molecules of said gas laser medium at the $00^01$ vibrational energy level, said $N_2$ constituent functioning as an energizing gas to enhance the excitation of the $CO_2$ molecules at the $00^01$ vibrational energy level, means for cooling the gas laser medium to a predetermined gas kinetic temperature, means for transferring the excited $CO_2$ molecules from the $00^01$ vibrational energy level to the $02^00$ vibrational energy level by stimulated emission produced by subjecting said excited gas laser medium to laser radiation of approximately 9.4 microns, means operatively connected between said DC excitation means and said means for transferring to delay the application of the 9.4 micron laser radiation for a time after the electrical excitation of the gas laser medium which is sufficient to allow the population of the $01^10$ vibrational energy level of the $CO_2$ molecules to substantially relax to the population value of said predetermined gas kinetic temperature, said transfer of the excited $CO_2$ molecules to the $02^00$ vibrational energy level creating a population inversion between the $02^00$ vibrational energy level and the $01^10$ vibrational energy level of the $CO_2$ molecules, said He constituent of said gas laser medium functioning to depopulate the $01^10$ vibrational energy level of the $CO_2$ molecules to enhance the depopulation inversion between the $02^00$ vibrational energy level and $01^10$ vibrational energy level, said population inversion between the $02^00$ and $01^10$ vibrational energy levels being sufficient to produce laser radiation of approximately 16 microns, and means for extracting said 16 micron laser radiation available from said population inversion.

8. Apparatus as claimed in claim 7 wherein said predetermined gas kinetic temperature is approximately 150° K.

9. In a method of operating a $CO_2$ gas laser apparatus to produce 14 micron laser radiation wherein excitation of the $CO_2$ gas laser medium in an electrical discharge region populates the $00^01$ vibrational energy level with excited $CO_2$ molecules to achieve a population inversion between the $00^01$ and $10^00$ vibrational energy levels of the $CO_2$ molecule, the excited $CO_2$ molecules being then transferred from the $00^01$ vibrational energy level to the $10^00$ vibrational energy level to achieve a population inversion between the $10^00$ vibrational energy level and the $01^10$ level of the $CO_2$ molecules, said latter population inversion supporting the extraction of 14 micron laser radiation, an improvement comprising the steps of, mixing $CO_2$ and $N_2$ to produce said gas laser medium, said $N_2$ constituent functioning as an energizing gas to excite said $CO_2$ molecules at the $00^01$ vibrational energy level in response to direct electrical excitation of said gas laser medium, directly cooling the gas laser medium of $CO_2$ and $N_2$ to a predetermined gas kinetic temperature, flowing said cooled gas laser medium through the electrical discharge region of the laser apparatus, electrically exciting said gas laser medium via direct electrical discharge excitation, delaying the transfer between the $00^01$ and the $10^00$ energy levels of the $CO_2$ molecules for a time after the electrical excitation of said gas laser medium which is sufficient to allow the population of the $01^10$ vibrational energy level of the $CO_2$ molecule to relax substantially to the population value of said predetermined gas kinetic temperature, and transferring the excited $CO_2$ molecules, after said delay, from $00^01$ level to the $10^00$ level by stimulated emission.

10. In a method as claimed in claim 9 further including the step of mixing He with said $CO_2$ and $N_2$ to form said gas laser medium, said He constituent functioning to depopulate the $01^10$ vibrational energy level of the $CO_2$ molecules to enhance the population inversion between the $10^00$ level and the $01^10$ level.

11. In a method as claimed in claim 9 wherein the relaxing of the population of the $01^10$ vibrational energy level results in a rise in the gas kinetic temperature, further including the step of, mixing He with the $CO_2$ and the $N_2$ to form said gas laser medium to enhance the relaxation process of the population of the $01^10$ vibrational energy level and to minimize the rise in kinetic temperature of the laser gas resulting from the relaxation process.

12. In a method as claimed in claim 9 wherein said predetermined gas kinetic temperature is approximately 150° K.

13. In a method as claimed in claim 9 further including the step of collisionally deactivating the $01^10$ vibrational energy level of the $CO_2$ molecules at a rate which is faster than the rate of collisional deactivation of the $00^01$ vibrational energy level of the $CO_2$ molecules by mixing He with the $CO_2$ and $N_2$ to form said gas laser medium.

* * * * *